United States Patent [11] 3,550,844

[72] Inventors Giovanni Cerutti;
Giuseppe Ricciardi, Ivrea, Turin, Italy
[21] Appl. No. 802,371
[22] Filed Feb. 26, 1969
[45] Patented Dec. 29, 1970
[73] Assignee Ing. C. Olivetti & C., S.p.A.
Ivrea, Turin, Italy
a corporation of Italy
[32] Priority Mar. 1, 1968
[33] Italy
[31] No. 50727-A/68
Pat. 831158

[54] GUIDE DEVICE FOR RECORDING SUPPORTS OF DIFFERENT WIDTHS
12 Claims, 5 Drawing Figs.

[52] U.S. Cl. .......... 234/128, 234/131
[51] Int. Cl. .......... G06K 1/02
[50] Field of Search .......... 234/128, 131

[56] References Cited
UNITED STATES PATENTS

| | | | |
|---|---|---|---|
| 3,024,971 | 3/1962 | Kettnich | 234/128X |
| 3,275,233 | 9/1966 | Frankel | 234/128X |
| 3,268,164 | 8/1966 | Purzycki | 234/128 |
| 3,387,117 | 6/1968 | Bungard et al. | 234/128X |

*Primary Examiner*—William S. Lawson
*Attorney*—Kevin C. Mc Mahon

ABSTRACT: Guide devices for guiding recording supports through recording and reading apparatus in which the guide devices comprise a plurality of fixed-width guide elements operable upon insertion of a recording support of corresponding width and an adjustable guide for greater widths.

PATENTED DEC 29 1970

3,550,844

INVENTORS
GIOVANNI CERUTTI
GIUSEPPE RICCIARDI
BY [signature]
ATTORNEY

INVENTORS
GIOVANNI CERUTTI
GIUSEPPE RICCIARDI

BY Thomas N. Tarrant

ATTORNEY

INVENTORS
GIOVANNI CERUTTI
GIUSEPPE RICCIARDI
BY Thomas V. Lamont
ATTORNEY

GUIDE DEVICE FOR RECORDING SUPPORTS OF DIFFERENT WIDTHS

CROSS REFERENCE TO RELATED APPLICATION

Applicant claims priority from corresponding Italian Pat. application Ser. No. 50727-A/68 filed Mar. 1, 1968, now Italian Pat. No. 831,158 issued Dec. 2, 1968.

BACKGROUND OF THE INVENTION

1. Field of the Invention

The present invention relates to guide devices for guiding tapes, cards or other record supports through recording devices such as perforators and through readers. In particular it relates to guide devices adaptable to guide supports of a plurality of different widths and/or structural characteristics.

2. Description of the Prior Art

There are known guide devices for coded data perforators and readers comprising a shoulder for guiding one side of a support inserted therein for perforation or reading, a guide element adapted to be shifted manually in a transverse direction to be located at a distance from the shoulder equal to the width of a card to be perforated or read along a marginal strip and at least one pair of guide members normally intersecting a bearing surface for the record support for guiding the other side of a paper tape.

Prior devices of this type are generally complicated and costly. Moreover, they cannot allow the initial portion of a card to be read.

SUMMARY OF THE INVENTION

The present invention provides a guide device for tape and card record supports of different widths, comprising two bearing surfaces between which the tape or card slides in the direction of advance, a shoulder for guiding one edge of the tape or card as it slides between the bearing surfaces, a guide element for guiding the other edge of the card, the position of the guide element being manually adjustable transverse to the direction of advance for accommodating cards of different widths, and a pair of guide members spaced from each other in the direction of advance and each resiliently biased to intersect one of the bearing surfaces to provide a guide for the other edge of a tape, the guide members being displaceable against the resilient bias by a support of greater width than a tape whose width is equal to the spacing of the guide members from the shoulder.

The invention will be described in more detail, by way of example, with the aid of the accompanying drawings.

DESCRIPTION OF THE PREFERRED EMBODIMENTS

Figure 1:
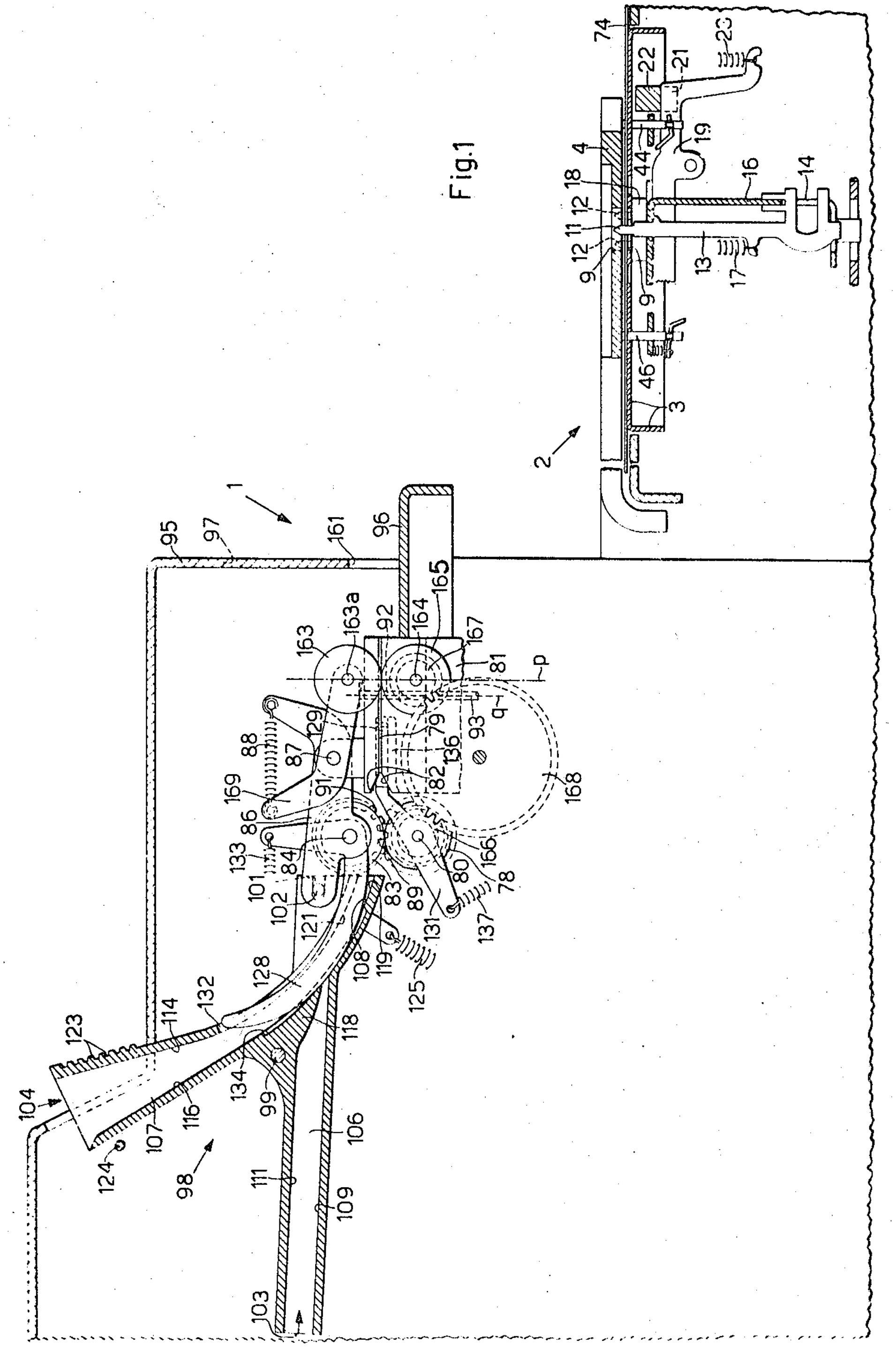
FIG. 1 is a partial longitudinal section from the left of a teleprinter incorporating a perforator and a reader for perforated paper tape and for cards perforated or punched in a marginal portion, the perforator and reader each comprising a guide device according to the invention.

Referring to FIG. 1, on the left-hand side of the teleprinter there is arranged at the top a coded data perforator indicated generally by the reference 1, while at the bottom and in front with respect to the perforator 1 there is arranged a coded data reader indicated generally by the reference 2. The perforator 1 incorporates a guide device for the recording support, constituting a first embodiment of the invention. The recording support may be of various widths and may be constituted, for example, by a paper tape to be perforated or punched along five or eight tracks or by a card to be punched along a marginal strip.

The advance of the support to be perforated is controlled by a milled roller 78 (FIG. 1) fixed on a shaft 80 which is rotatable clockwise step-by-step in the manner described in the specification of application Ser. No. 648,768 filed June 26, 1967, with reference to the roller indicated therein by the reference 81. The support to be perforated is guided by a slit 79 in a die 81. The support to be perforated is guided by a slit 79 in a die 81. The slit has two surfaces 82 in the form of a V for facilitating the insertion of the support.

The support to be perforated is normally pressed against the roller 78 by a plain second roller 83 rotatable on a shaft 84 fixed to a lever 86 pivoted on a fixed shaft 87. The lever 86 is biased anticlockwise by a spring 88. The two rollers 78 and 83 are fixed to two corresponding pinions 89, 91 which are alike and normally in engagement.

The die 81 is provided with a series of eight cylindrical seats 92 (FIG. 2) disposed transversely of the direction of advance of the support and adapted to house a series of perforating punches 93 for the code combinations. Another cylindrical seat 94 smaller than the seats 92 is adapted to house a perforating punch 92*a* (FIG. 2) for the usual hole for drawing the perforated support along. The punches 93 (FIG. 1) are normally disposed below the slit 79 and can be actuated selectively to perforate the support in the manner described in the said application Ser. No. 648,768. In front of the die 81 there is disposed a fixed plate 96 for conveying the perforated support forward. The support then emerges through an opening 97 (FIG. 3) formed in the cover 95 of the teleprinter.

In order to facilitate the insertion of the support to be perforated between the two rollers 78 and 83 (FIG. 1), a double conveyor, indicated generally by the reference 98, is provided, this being pivoted on a fixed shaft 99 and connected by means of a slot 101 to a pin 102 fixed to the lever 86. The conveyor 98 is provided with a rear opening 103 for the insertion of paper tapes and with an upper opening 104 for the insertion of cards. The openings 103 and 104 give access to respective guides 106 and 107, adapted to convey the support to be perforated into a single guide 108 which leads the support between the two rollers 78 and 83.

Figure 2:
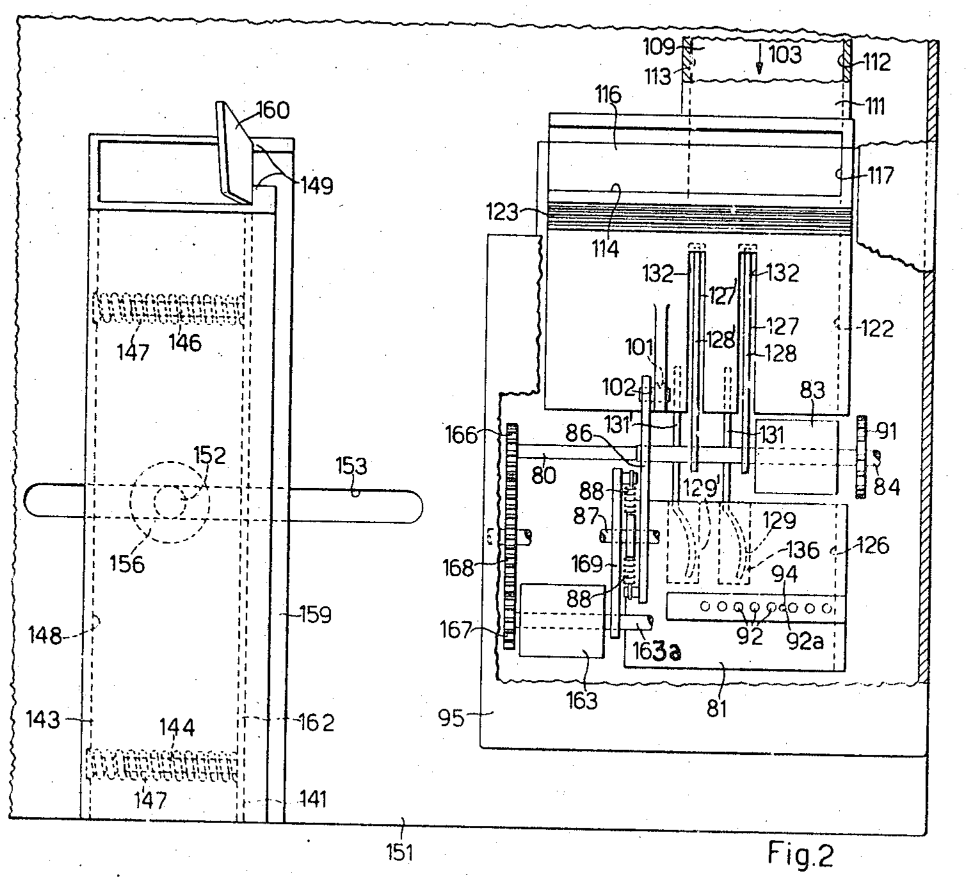
FIG. 2 is a partial plan view of the guide device of FIG. 1.

More particularly, the guide 106 comprises two horizontal walls 109, 111 and two vertical walls 112, 113 (FIG. 2). The latter are located at a distance from each other greater than the maximum width of the paper tape to be inserted. The guide 107 (FIG. 1), on the other hand, comprises a sloping arcuate front wall 114, a sloping arcuate rear wall 116 converging with the wall 114 and a single sidewall 117 (FIG. 2) in order to allow the card to project on the opposite side because of its greater transverse dimension, which is variable. The wall 111 (FIG. 1) of the guide 106 and the wall 116 of the guide 107 are joined together in a wedge-shaped block 118 pivoted on the shaft 99, leaving a passage for the tape towards the guide 108.

The guide 108, in turn, comprises an arcuate lower wall 119 connected to the wall 109, an arcuate upper wall 121 forming an extension of the wall 114 and a single sidewall 122 (FIG. 2). The conveyor 98 is normally urged clockwise by a spring 125 (which holds the roller 83 bearing against the roller 78). For the purpose of allowing the roller 83 (FIG. 1) to be raised manually for inserting the paper tape or the card to be punched in the die 81, the wall 114 of the conveyor 98 is provided with a manually engageable ridged surface 123 at the front.

If the support to be perforated is constituted by a five-channel paper tape, this is guided transversely, in correspondence with the rollers 78 and 83 and the die 81, on the right side by the wall 122 (FIG. 2) and by a shoulder 126 of the die 81 and on the left side by a vertical surface 127 of an arcuate lever 128 (FIG. 1) pivoted on the shaft 84 and by a cylindrical surface of a curved extension 129 (FIG. 2) of a second lever 131 pivoted on the shaft 80 (FIG. 1). The wall 122 (FIG. 2) and the shoulder 126 are in the same plane; the surface 127 of the lever 128 and the surface of the extension 129 are spaced from this plane by a distance substantially equal to the width of the five-channel tape. The lever 128 is rigid, while the lever 131 is made of thin flexible sheet metal so as to urge the tape against the shoulder 126 of the die 81.

The lever 128 is housed in a slot 132 formed in the walls 114 and 121 and, due to the action of a spring 133 (FIG. 1), is normally urged against the base of a recess 134 formed in the walls 116 and 119. On the other hand, the extension 129 of the lever 131 is housed in a cavity 136 formed in the die 81 and, due to the action of a spring 137, is normally urged against the upper wall of the cavity 136.

In order to guide on its left side an eight-track paper tape which is to be perforated, another pair of levers 128′ and 131′ (FIG. 2) is provided, these levers being respectively similar to the levers 128 and 131 and disposed in similar manner. The surface 127′ of the lever 128′ and the surface of the extension 129′ are spaced from the plane of the wall 122 and of the shoulder 126 by a distance equal to the width of the eight-track tape. When this tape is inserted, it excludes the levers 128 and 131 (FIG. 1) by overcoming the action of the springs 133 and 137.

If, on the other hand, the support to be perforated is constituted by a card to be punched along a marginal strip, the card is guided, in correspondence with the rollers 78 and 83 and the die 81, on that side where the strip to be punched is located by means of the wall 122 (FIG. 2) and the shoulder 126, like the paper tape, and on the other side by a vertical surface 141 of a rigid plate 162. This plate is housed in a holder 143 (FIG. 3) having a C-shaped cross section closed at the ends and which is supported on a portion 151 of the cover 95 of the perforator 1. Both the holder 143 and the portion 151 are bent in such manner as to be substantially aligned with the walls 116 and 119 (FIG. 1) of the conveyor 98. The plate 162 is equipped with two pins 144 and 146 (FIG. 1) inserted in a pair of compression springs 147 which bear against a wall 148 of the holder 143 at one end and normally hold the plate 162 resting against two shoulders 149 of the holder 143.

Fixed to the bottom of the holder 143 (FIG. 3) is a pin 152 by means of which the holder 143 is slidable in a transverse slot 153 (FIG. 2) of the portion 151 of the cover. The holder 143 is normally urged against the portion 151 of the cover 95 by a compression spring 154 (FIG. 3) disposed between the portion 151 and a knob 156 fixed to the pin 152. Finally, the holder 143 is provided with a rest step 159 for the card which is disposed at the same lever as the slit 79 in the die 81. In order to facilitate the insertion of the card on the left side, the plate 162 (FIG. 2) is provided with a bent portion 160. To allow exit of the card from the cover 95 of the perforator, the opening 97 (FIG. 3) extends to the left in the form of a slot 161.

For the purpose of causing the card to advance when it is no longer in engagement with the rollers 78 and 83 (FIG. 1), another pair of draw rollers 165 and 163 is provided, these being arranged to the left of the path of advance of a paper tape (FIG. 2). The roller 165 is rotatable clockwise step-by-step to draw the punched card from the roller 78 by means of a pair of gears 166, 167 and via an idler 168. The gears 166 and 167 are fixed to the shaft 80 and the shaft 164, respectively, and are of the same diameter.

The roller 163 is rotatable on a shaft 163*a* fixed to an arm 169 pivoted in turn on the shaft 87 and normally biased clockwise by the spring 88 so as to press the roller 163 against the roller 165. The line of contact of the rollers 165 and 163 is disposed substantially in the lower plane of the slit 79 in the die 81, while the axes of rotation of the rollers 165 and 163 are disposed in a plane $p$ perpendicular to said lower plane. The plane $p$ is located at a distance from a plane $q$ which is equal to that desired between the front edge of the card and the axis of the first row of holes, the plane $q$ being determined by the axes of the cylindrical seats 92 and 94. More particularly, this distance, taking account of the thickness of the card, is such that the front edge of the card and the plane $q$ are spaced from each other by a length equal to the difference between the step of advance of the card and the radius of the code punch 93.

Figure 3:
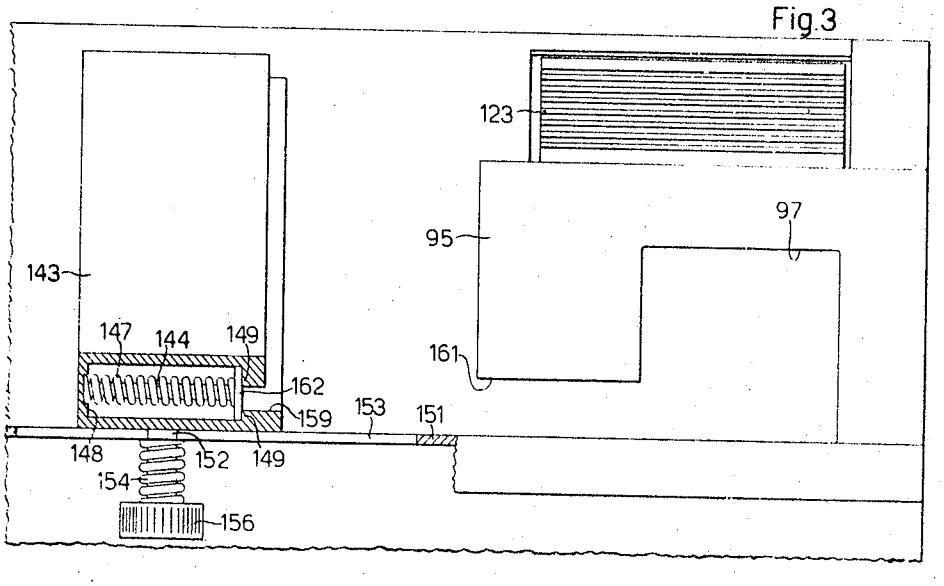
FIG. 3 is a partial front view of the guide device of FIG. 2.

The guide device described operates in the following manner:

If the support to be inserted in the perforator 1 (FIG. 1) is a paper tape, with the perforator at a standstill the ridged surface 123 is pushed manually and the conveyor 98 is caused to pivot in opposition to the action of the springs 88 and 125 until it is arrested against a fixed stop 124. The pin 102 then causes the roller 83 to rise and move away from the roller 78. The tape is now inserted in the opening 103 of the conveyor 98 and is slipped into the guide 106, the guide 108, between the two roller 78 and 83 and into the slit 79 in the die 81 until it emerges from the front opening 97 of the perforator (FIG. 3).

If the tape to be perforated is a five-track tape, it is guided on the left by the surface 127 (FIG. 2) of the lever 128 and the surface of the extension 129 of the lever 131, while the levers 128′ and 131′ do not have any effect. If, on the other hand, the tape to be perforated is an eight-track tape, when it enters the guide 108 the lever 128 is slightly raised in opposition to the action of the spring 133. Similarly, when the tape engages the lever 131, this lever is rotated slightly clockwise in opposition to the action of the spring 137. The eight-track tape is now guided on the left by the surface 127′ (FIG. 2) of the lever 128′ and by the surface of the extension 129′ of the lever 131′. In both cases the tape is urged continuously and resiliently against the shoulder 126 of the die 81 by the transverse resilient action of the levers 131 and 131′, respectively. After the tape has been inserted, the surface 123 (FIG. 1) of the conveyor 98 can be released, as a result of which the conveyor 98 and the roller 83 return to their rest positions due to the action of the springs 88 and 125. On changing from the five-track tape to the eight-track tape and vice versa, the type of coding is changed over in the perforator by known means, so that in the case of the five-track tape the three punches 93 on the left are never actuated.

If the support to be inserted in the perforator is a card to be punched along a marginal strip, it is necessary as hereinbefore described, to cause the conveyor 98 (FIG. 1) to pivot in order to raise the roller 83. It is to be noted that this raising action urges the roller 163 against the roller 165 by means of the spring 88 with a slightly greater force. The card is now inserted in the opening 104 of the conveyor 98 and brought up to the wall 122 (FIG. 2). The card slides along the guides 107 and 108 and is lightly pressed against the curved edges of the levers 128 and 128′, which are therefore raised. The card then causes the levers 131 and 131′ to be lowered and is stopped against the two rollers 165 and 163.

Moreover, on insertion of the first card, the knob 156 is operated and the holder 143 is now shifted transversely manually and the plate 162 is brought into contact with the card. Due to the action of the springs 147, the plate 162 enables the card to be held against the wall 122 and the shoulder 126 and facilitates the insertion of the following cards. Finally, the surface 123 of the conveyor 98 is released, as a result of which the conveyor 98 and the roller 83 return to their rest positions, while the roller 163 is now held so that it bears against the roller 165 with the normal tension of the spring 88 and can be raised by the card during its advance.

Since the card is fed by two pairs of rollers 78, 83 and 165, 163, the card does not need conventional prepunched holes for advance in the perforator. Inasmuch as the front edge of the card stops initially against the rollers 165 and 163 is spaced from the plane $q$ by a length equal to the difference between the step of advance of the card and the radius of the punches 93, the centers of the holes of the first code punched in the card will be spaced from the front edge of the card by this said length. This renders possible the insertion of the punched card over the conventional advancing pins of the reader without having to punch any advancing hole in addition to those punched together with the code combinations. It is thus possible to use cards without initial perforations, because for punching the coded data, cards without initial perforations are cheaper than those which have been initially perforated.

Figures 4, 5:
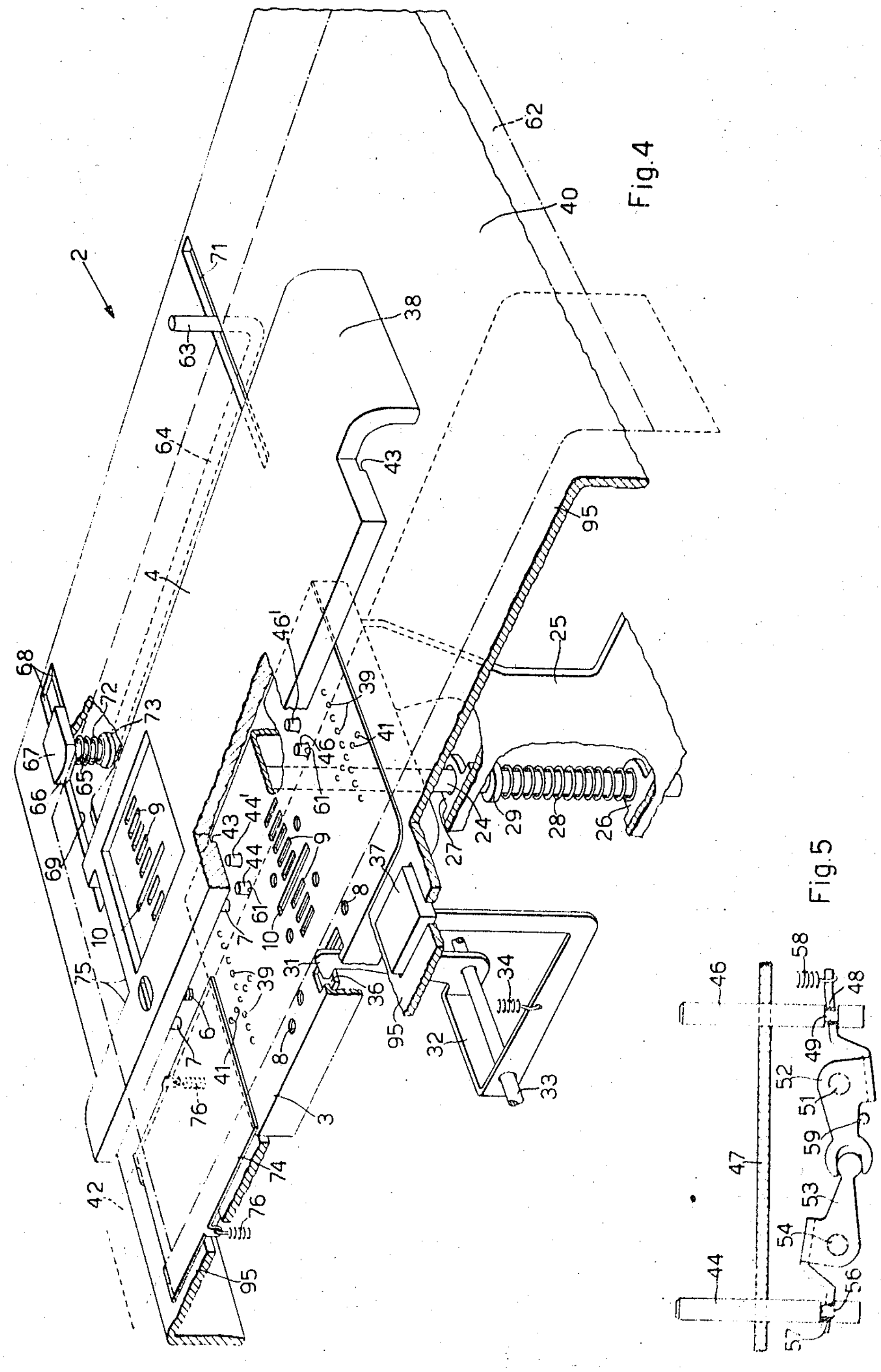
FIG. 4 is a partially exploded and cut away rear perspective view from the right of the guide device of the reader of FIG. 1 on a larger scale.
FIG. 5 is a side view of a detail of the device of FIG. 4 on a larger scale.

The reader 2 incorporates a guide device for the recording support constituting another embodiment of the invention. The recording support may also have different widths in this case, for example such supports may be paper tapes perforated in five or eight tracks and cards punched along a marginal strip. The support to be read passes between a pair of plates 3 and 4 (FIG. 4) fixed together by a screw 6. In FIG. 4, the plate 4 has been moved upward for clarity. Two pins 7 fixed to the plate 4 engage in two holes 8 in the plate 3 to facilitate the connection of the two plates 3 and 4 in the correct relative position. The plates 3 and 4 are provided with eight longitudinal slots 9, to allow the passage of a series of sensing elements 11 (FIG. 1) disposed transversely of the recording support, and with a slot 10 (FIG. 4) to allow the passage of a group of advancing or feed pins 12 (FIG. 1) disposed along the support. The slots 9 and 10 (FIG. 4) are of a length such as to permit the movement of the sensing elements 11 and the pins 12 (FIG. 1) by one step during the reading of the support, which is effected during the advance or feed of the support. It should be noted that the slot 10 (FIG. 4) is disposed to the left of the group of three slots 9 to an observer looking in the direction of the support (to the right in FIG. 4), while in the perforator 1 the punch 95 (FIG. 2) for the draw hole is to the left of the group of three code punches 94. This enables any support to be inserted in the reader 2 (FIG. 1) and, more particularly, the tape leaving the perforator 1, by turning it over downwardly and to the rear, to feed back between the plates 3 and 4 from right to left in FIG. 1.

The sensing elements 11 are fixed individually to a corresponding series of rods 13 each of which is slidable in a slot 14 in a frame 16 and biased upwardly by a spring 17. The pins 12, on the other hand, are fixed to a shoe 18 fast with the frame 16, which is fixed to a crossmember 19 guided by two vertical slots 21 (only one of which is visible in the drawing) in two fixed bars 22. The crossmember 19 normally bears against the bases of the slots 21 due to the action of two springs 23. When the reader is actuated, the crossmember 19 is moved along a closed path which can be covered in one sense or the other in the manner described in the specification of our application Ser. No. 667,792 filed Sept. 14, 1967. More particularly, the crossmember 19 is shifted in a first period parallel to the plates 3 and 4 to move the recording support forward or backward and in a second period perpendicularly to the plates 3 and 4 for the reading of the coded data.

Fixed to the lower plate 3 (FIG. 4) is a vertical shaft 24 slidable in two drilled flanges 26 and 27 of a portion 25 of the fixed frame of the machines. A compression spring 28 is arranged between a collar 29 on the shaft 24 and the flange 26. The plates 3 and 4 are normally held down in the reading position in opposition to the action of the spring 28 by a tooth 31 of a bail 32 pivoted on a fixed shaft 33. The tooth 31 is normally held, by the action of a spring 34, engaged over a small plate 36 fixed to the plate 3. The bail 32 is adapted to be actuated manually by means of a key 37 projecting from the surface of the cover 95 of the teleprinter. In the reading position, the plate 3 is arranged in the same plane as the cover 95. The plate 4 extends to the rear as far as a curved edge 40 of the cover 95, where it has a bent portion 38 adapted to convey the recording support along the rear side of the cover. On the upper surface of the plate 3, at the front and rear of said plate 3, there are disposed transverse reference protuberances 39, over which the holes of the code combination can be placed, and longitudinal reference protuberances 41, over which the draw holes of the recording support can be placed to facilitate the positioning thereof.

If the recording support is constituted by a perforated paper tape 42 (shown in dash lines in FIG. 4), for example of the type having five punched tracks, the tape is guided on the right side (the left side in FIG. 4) by a shoulder 43 of the plate 4 and on the left side by two pins 44 and 46 spaced from the shoulder 43 by a distance equal to the width of the tape 42. More particularly, the pins 44 and 46 (FIG. 5) are slidable in two holes in a portion 47 of the fixed frame of the reader. The pin 46 has a groove 48 in which there is engaged a notch 49 of a lever 52 pivoting on a fixed shaft 51. The lever 52, in turn, is connected to a second lever 53 pivoting on another fixed shaft 54 and connected by means of a notch 56 with a groove 57 in the pin 44. Due to the action of a spring 58, the lever 52 normally bears against a fixed pin 59, in a position in which it is turned anticlockwise, and in its turn holds the lever 53 turned clockwise. In this way, the pins 44 and 46 are urged upwardly so as to pass through two corresponding holes 61 (FIG. 4) in the plate 3 to prevent lateral wandering of the perforated tape 42 to be read.

Similarly, if the recording support is constituted by an eight-track tape, the tape is guided on the right side by the shoulder 43 (FIG. 4) of the plate 4 and on the left side by two pins 44' and 46' similar to the pins 44 and 46 and interconnected by a pair of levers like the levers 53 and 52 (FIG. 5) and not visible in the drawings.

If, on the other hand, the recording support to be read is constituted by a card 62 (shown in FIG. 4 in chain-dotted lines) which is punched along a marginal strip, the card is guided in the direction of advance on the side where the punched strip is located by means of the shoulder 43 of the plate 4. On the other side, the card is guided by an upwardly bent portion 63 of a longitudinal round bar 64 and by an edge 66 of a plate 67. This plate is fixed to a second upwardly bent portion 65 of the round bar 64 and is slidable along two inclined edges 68 of a transverse slot 69 in the cover 95. The portion 63 is slidable in turn in a second transverse slot 71 in the cover 95. The plate 67 is normally urged against the two edges 68 by a compression spring 72 disposed between the cover 95 and a washer 73 fixed to the portion 65 of the bar 64.

In order to facilitate the insertion of the card 62 between the two plates 3 and 4, the guide arrangement finally comprises a plate 74 hinged at the front to the cover 95 and bearing at the rear on the plate 3 through the action of two springs 76.

The guide device operates in the following manner:

To insert the recording support to be read in the reader with the reader at a standstill, the key 37 is depressed causing the bail 32 to turn clockwise and thus releasing the plates 3 and 4. The plates, urged by the spring 28, move upward until the shaft 24 is arrested by means of the collar 29 against the flange 27. In this position, the sensing elements 11, the pins 12 (FIG. 1) and the pins 44, 46 and 44', 46' are completely below the plate 3.

If the support is a five-track tape 42 (FIG. 4), this can be slipped between the plate 3 and the plate 4 laterally from the left until it is arrested against the shoulder 43. The exact position of the tape 42 to be read is determined by making the code perforations and the draw perforations coincide with the protuberances 39 and 41. The plates 3 and 4 are then lowered until the plate 36 is engaged below the tooth 31. In this way, the pins 12 of the shoe 18 (FIG. 1) come into engagement with the draw holes of the tape 42, while the sensing elements 11 enter such holes as are punched in the code combination. Those sensing elements 11 in correspondence with which a hole has not been punched in the tape are shifted downwardly in opposition to the action of the respective springs 17. Moreover, the pins 44 and 46 (FIG. 4) are brought into contact with the upper plate 4, thus guiding the side of the tape 42 opposite that guided by the shoulder 43 and preventing the escape of the tape during the reading process.

If the tape has eight tracks, the pin 44 is pushed downward by the tape in consequence of the lowering of the plates 3 and 4, thereby causing the lever 53 (FIG. 5) to turn anticlockwise in opposition to the elastic force of the spring 58. Consequently, the lever 52 is turned anticlockwise (FIG. 5) bringing the pin 46 to the same height as the pin 44, as a result of which the pins 44 and 46 do not interfere with the tape. On the other hand, the pins 44' and 46' (FIG. 4) are brought into contact with the left side of the tape, which is thus guided in a similar manner to that seen in the case of the five-track tape 42.

If, on the other hand, the support is a card 62 punched along a marginal strip, when the plates 3 and 4 are raised the card 62 is slipped between the plates 3 and 4 from the front (from the rear in FIG. 4) and is caused to slide over the plate 74 in the direction of advance until it covers the first hole 61 encountered in the plate 3. The card 62 can be positioned accurately by acting with the hand at a recess 75 in the plate 4 so as to cause the code and draw perforations to coincide with the front groups of protuberances 39 and 41, after the card has been brought up against the shoulder 43 on the side where the punched strip is located. The plate 67 is then shifted transversely manually by sliding it in frictional engagement along the edges 68 until the edge 66 and the portion 65 are brought into contact with the edge of the card remote from the punched strip.

Then, as soon as the plates 3 and 4 are lowered, the card 62 pushes the two pins 44 and 44' downward and these, in turn, cause the pins 46 and 46' to be lowered, so that they do not impede the advance of the card 62 during the reading thereof.

The invention can be used for cards folded in concertina fashion instead of for single cards.

We claim:

1. A guide device for tape and card record supports of different widths, comprising:

a. two bearing surfaces between which the tape or card slides in the direction of advance;

b. a shoulder for guiding one edge of the tape or card as it slides between the bearing surfaces;

c. a guide element for guiding the other edge of the card, the position of the guide element being manually adjustable transverse to the direction of advance for accommodating cards of different widths; and d. a pair of guide members spaced from each other in the direction of advance and each resiliently biased to intersect one of the bearing surfaces to provide a guide for the other edge of a tape, the guide members being displaceable against the resilient bias by a support of greater width than a tape whose width is equal to the spacing of the guide members from the shoulder.

2. A guide device according to claim 1 in combination with a perforator having a perforator die and perforating punches wherein portions of said bearing surfaces are formed by a slit in the perforator die, the said guide members consisting of a first lever urged resiliently into a recess in one of said two bearing surfaces, and a second lever urged resiliently against the other of said two bearing surfaces, and the first and second levers being shifted one after the other above and below the bearing surfaces, respectively, when they are engaged by the support of greater width advanced between the bearing surfaces.

3. A device according to claim 2, wherein the said recess is formed in a wall of an input conveyor, whereby the first lever guides a tape at the entrance of the perforator and the second lever is urged against a portion of said bearing surfaces formed by said slit so as to guide the tape during the perforation in correspondence with the die.

4. A device according to claim 3, wherein the perforator comprises a first driving roller adapted to be actuated step-by-step to push the tape or card into the die and a second roller normally pressed resiliently against the driving roller, the second roller being carried by a member connected to said input conveyor, at least a portion of said input conveyor being manually engageable to shift the said connected member in such manner as to move the second roller away from the driving roller and permit the insertion of the tape or card.

5. A device according to claim 4, comprising third and fourth rollers adapted to engage the card or tape at the exit of said die, said third roller being rotated step-by-step by said first driving roller via intermediate gears and said fourth roller being normally urged resiliently against said third roller to draw the card or tape along even when it is out of engagement with said first and said second rollers.

6. A device according to claim 5, wherein said slit has an upper plane and a lower plane and said third and fourth rollers have their line of contact at the same level as the lower plane of said slit and have their axes in a plane perpendicular to said lower plane and located at a distance from the plane common to the axes of the perforating punches such as to arrest a card to be punched in such a position that the centers of the holes of the first code punched are spaced from the front edge of the card by the difference between the step of said driving roller and the radius of said punches.

7. A device according to claim 5, wherein said fourth roller is rotatable on a second member pivoted coaxially with the said connected member and connected thereto by means of a spring which urges it against said third roller so that when said second roller is raised, said fourth roller is urged against said third roller with increased force.

8. A device according to claim 2, wherein a part of the said shoulder is carried by said die and said guide element comprises a rigid plate normally spring-biased to hold the card against the shoulder, said second lever being constituted by a resilient plate adapted to urge the tape against said shoulder.

9. A device according to claim 1 in combination with a reader for perforated supports wherein at least portions of said two bearing surfaces comprise two plates fixed to one another and movable in a direction perpendicular to the plane of the tape or card therebetween from a closed position to an open position to permit insertion of the tape or card, said shoulder being disposed between said plates and said guide members being slidable in one of the plates and normally projecting from this plate towards the other plate, the guide members remaining in the said one plate when the two plates are in the open position.

10. A device according to claim 9, wherein said guide members are connected by means of a pair of levers urged resiliently in such a manner as to hold the guide members projecting from the one plate, the levers being articulated together in such manner as to render the guide members displaceable simultaneously, so that by introducing said tape or card between one of the guide members and the other of the plates it does not encounter the other guide member.

11. A device according to claim 9, comprising a plate hinged at one side to a fixed surface and urged resiliently at the other against one of the said plates so as to form a chute with the other of the plates when they are in the open position in order to assist the insertion of the support in the direction of the advance.

12. Guides for record supports in recording and reading apparatus comprising:

a. first and second spaced surfaces defining a path of advance for a record support;

b. fixed guide means defining a boundary along one margin of said spaced surfaces;

c. a first pair of resiliently depressible guide members protruding between said spaced surfaces at a first fixed lateral distance from said fixed guide means corresponding to a first record support width, the members of said first pair spaced one before the other along said path of advance;

d. a second pair of resiliently depressible guide members protruding between said spaced surfaces at a second fixed lateral distance from said fixed guide means corresponding to a second record support width, the members of said second pair spaced one before the other along said path of advance; and e. adjustable guide means providing a guiding surface facing the plane parallel to and between said spaced surfaces and spaced from said fixed guide means an adjustable lateral distance greater than said second fixed lateral distance, whereby record supports of a variety of widths can be accommodated.